United States Patent [19]

Richardson et al.

[11] 4,298,163
[45] Nov. 3, 1981

[54] ELECTRONIC MULTI-ZONE TIMED TEMPERATURE CONTROL APPARATUS

[75] Inventors: John G. Richardson, Idaho Falls; Robert W. Soldat, Shelley, both of Id.

[73] Assignee: Envirotronics, Phoenix, Ariz.

[21] Appl. No.: 81,571

[22] Filed: Oct. 3, 1979

[51] Int. Cl.³ .................... F23N 5/20; G05D 23/00
[52] U.S. Cl. ................................ 236/46 R; 165/12; 236/47; 236/51
[58] Field of Search ............... 236/46 R, 47, 94; 165/12; 340/309.4

[56] References Cited

U.S. PATENT DOCUMENTS

| | | | |
|---|---|---|---|
| 4,079,366 | 3/1978 | Wong | 340/309.4 |
| 4,162,036 | 7/1979 | Balduzzi et al. | 236/47 |
| 4,191,328 | 3/1980 | Isaacs et al. | 236/47 X |
| 4,206,872 | 6/1980 | Levine | 236/46 R |

*Primary Examiner*—William E. Wayner
*Attorney, Agent, or Firm*—Ancel W. Lewis, Jr.

[57] ABSTRACT

The problem of adequate flexibility and reliability in apparatus for controlling temperatures in a plurality of zones is solved by a clock and digital logic circuits, together with a temperature sensing circuit portion effective in combination with platinum film-type temperature sensors, which produce effective sensing over a wide range of temperatures. The control apparatus automatically effects two temperature sets per twenty-four hour period for each zone with an optional temperature set for weekends for all zones and has a display of current time and a display of temperature for each zone.

28 Claims, 12 Drawing Figures

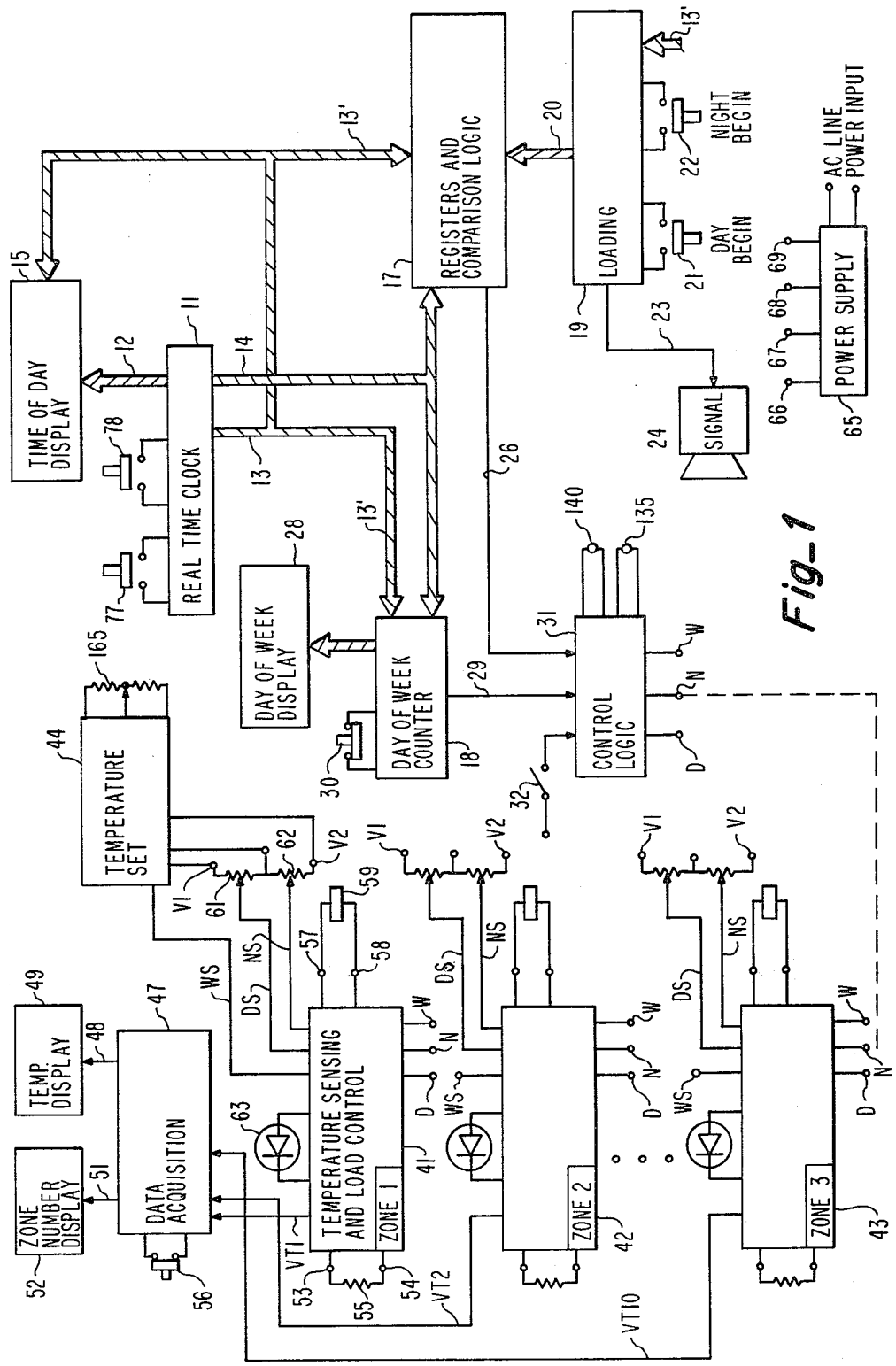
Fig_1

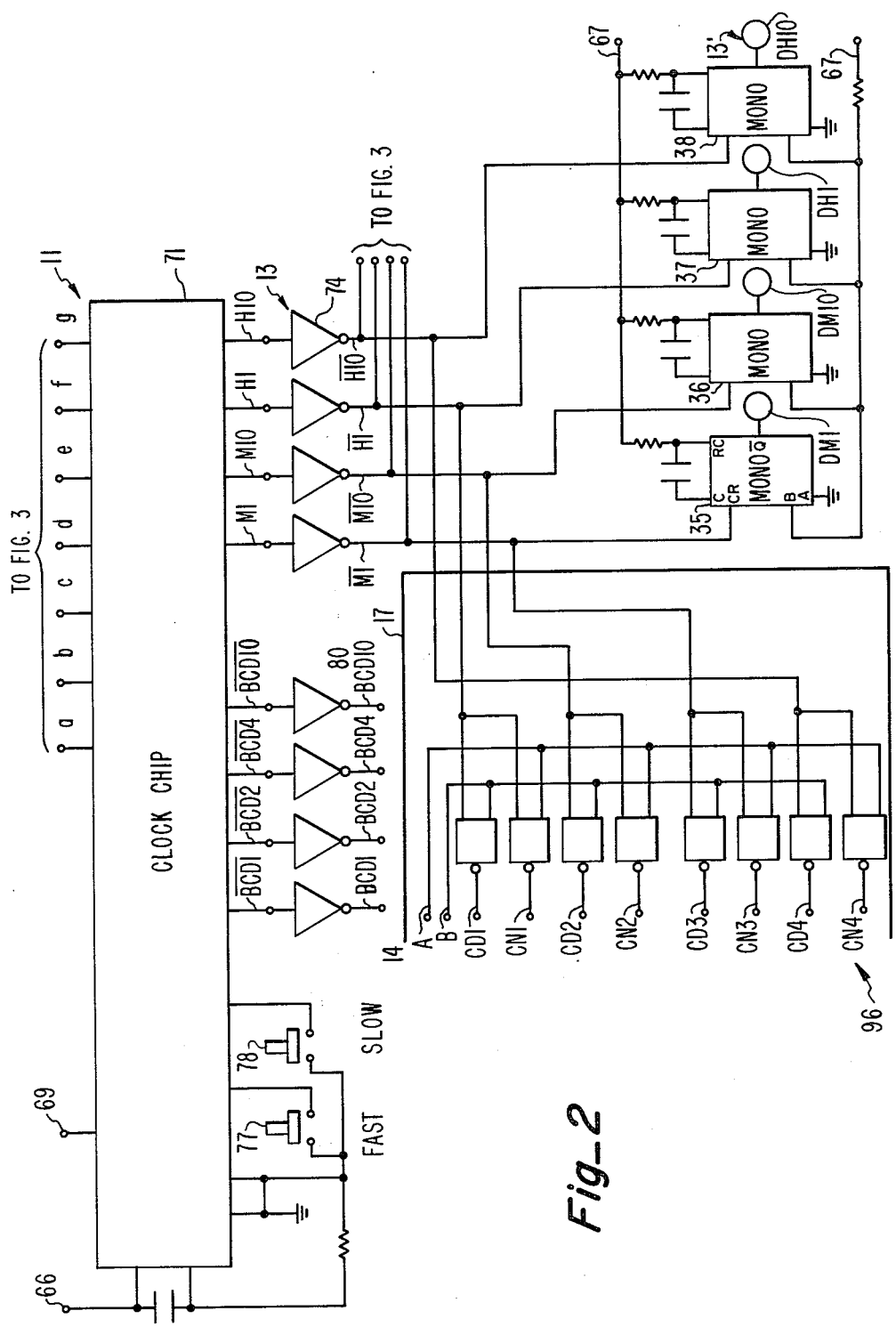
Fig_2

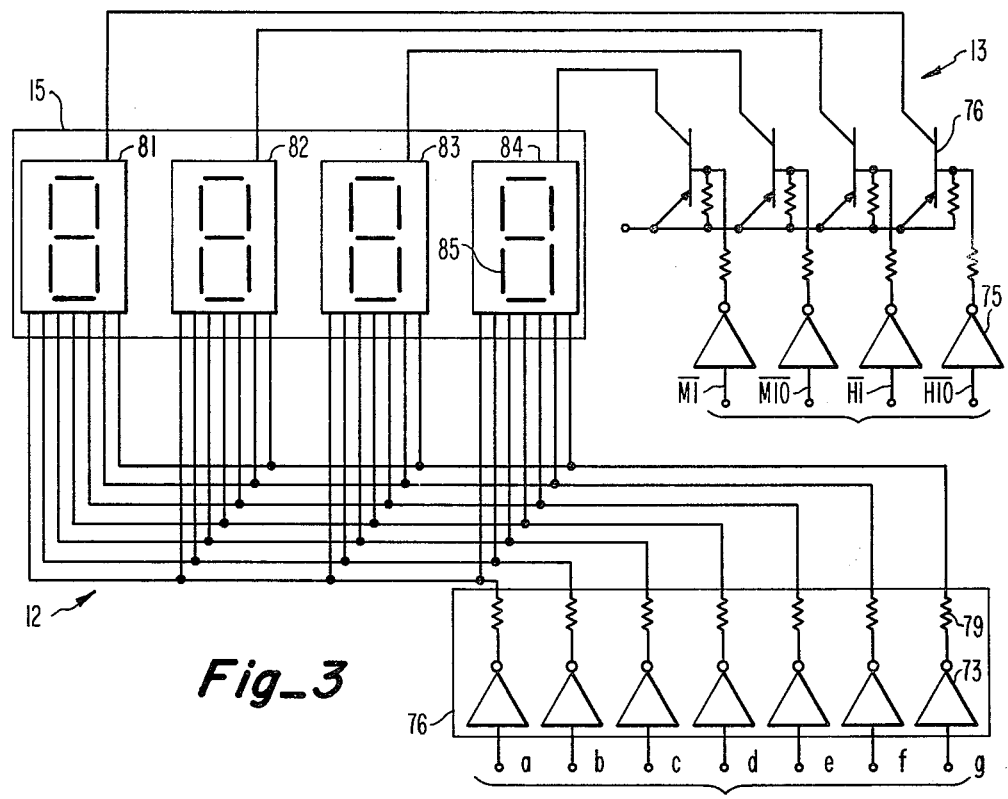
*Fig_3*
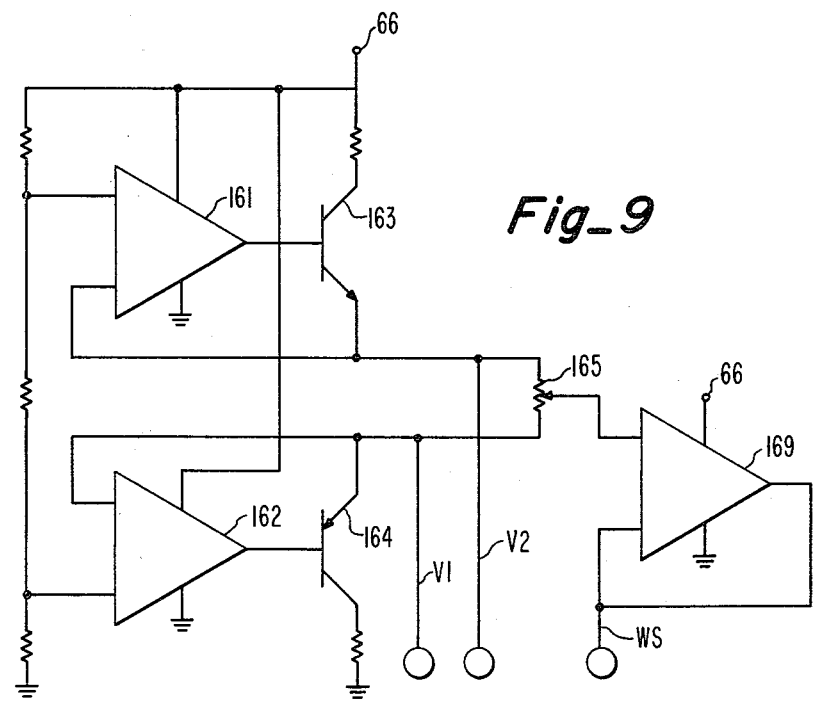
*Fig_9*

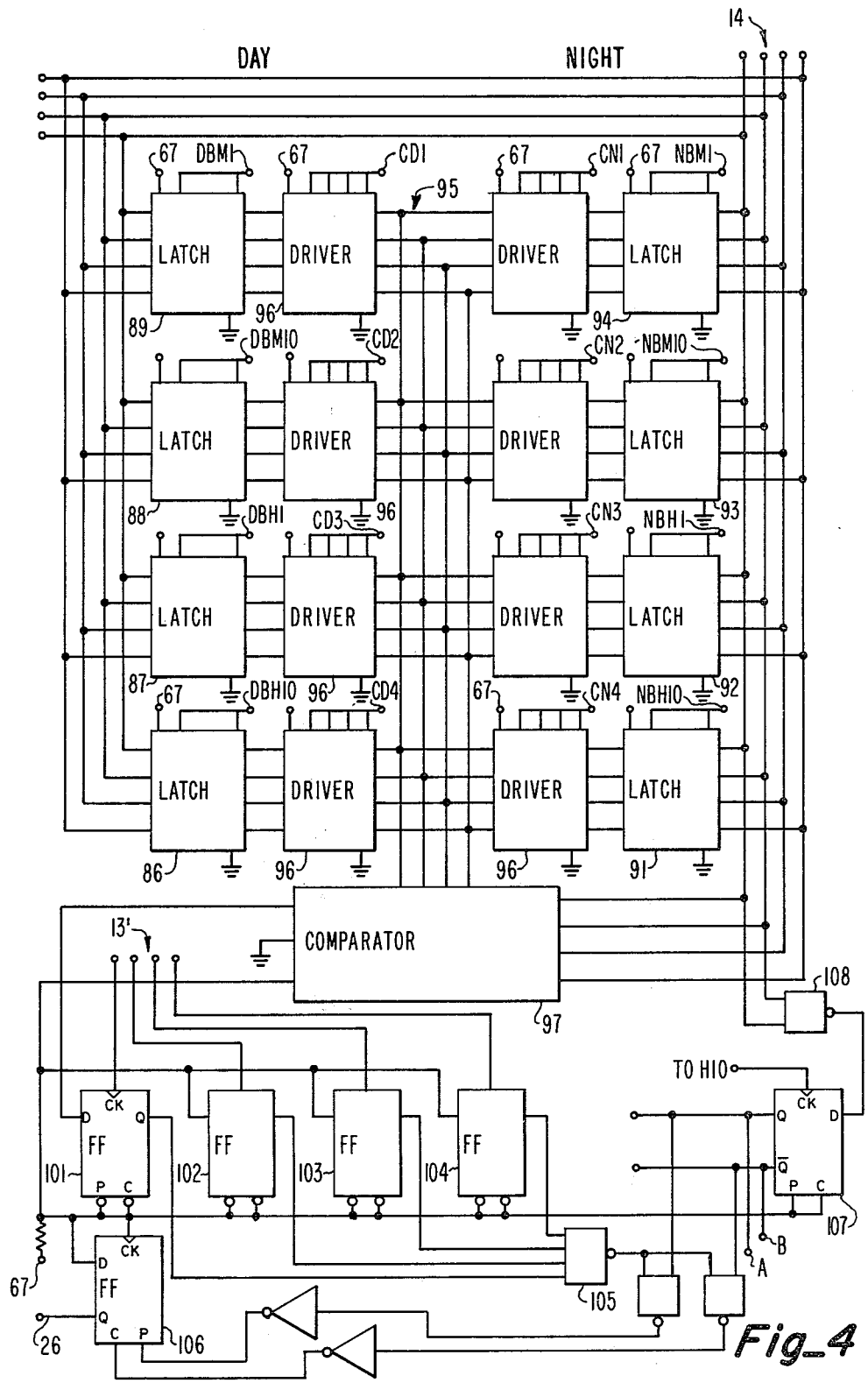
Fig_4

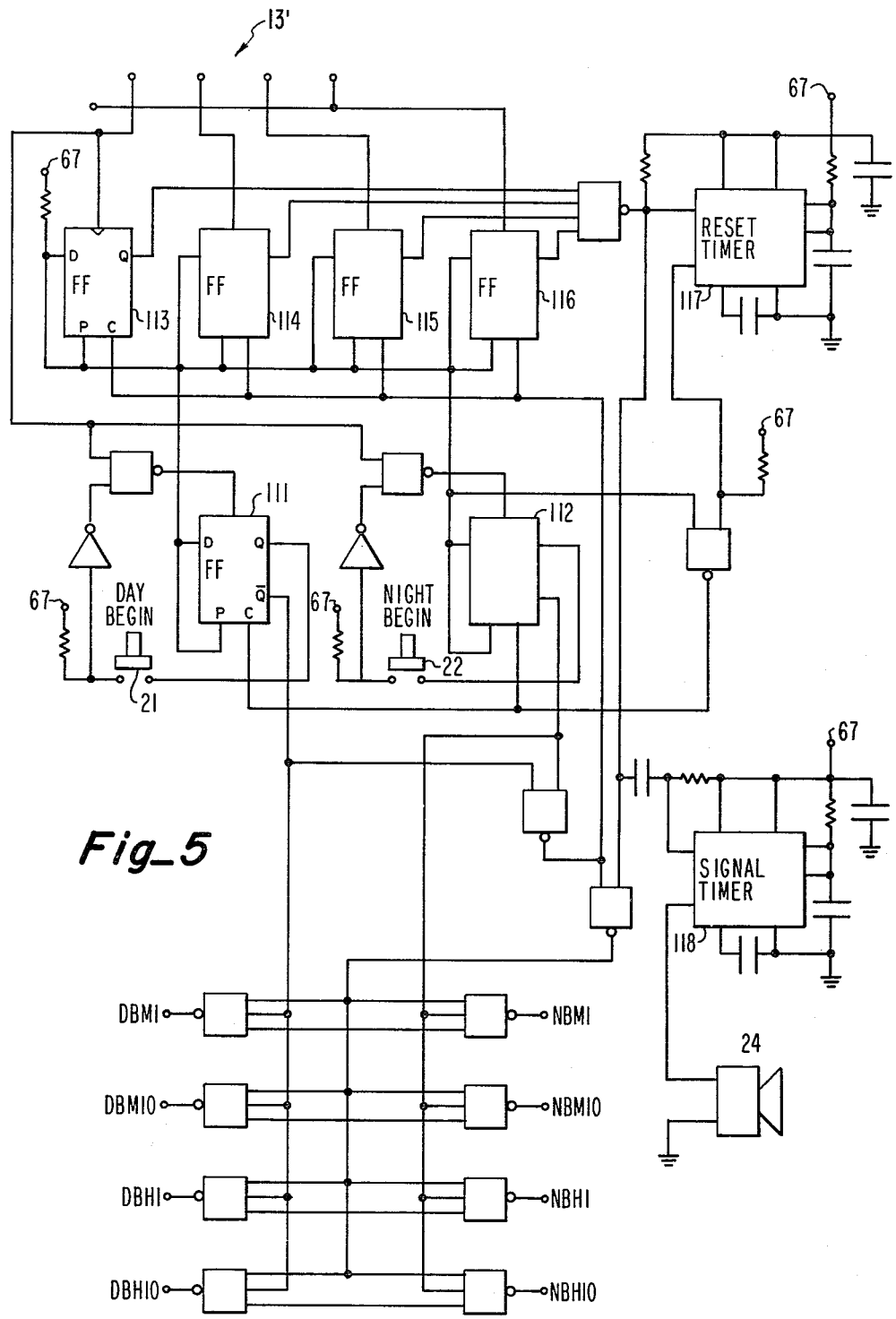

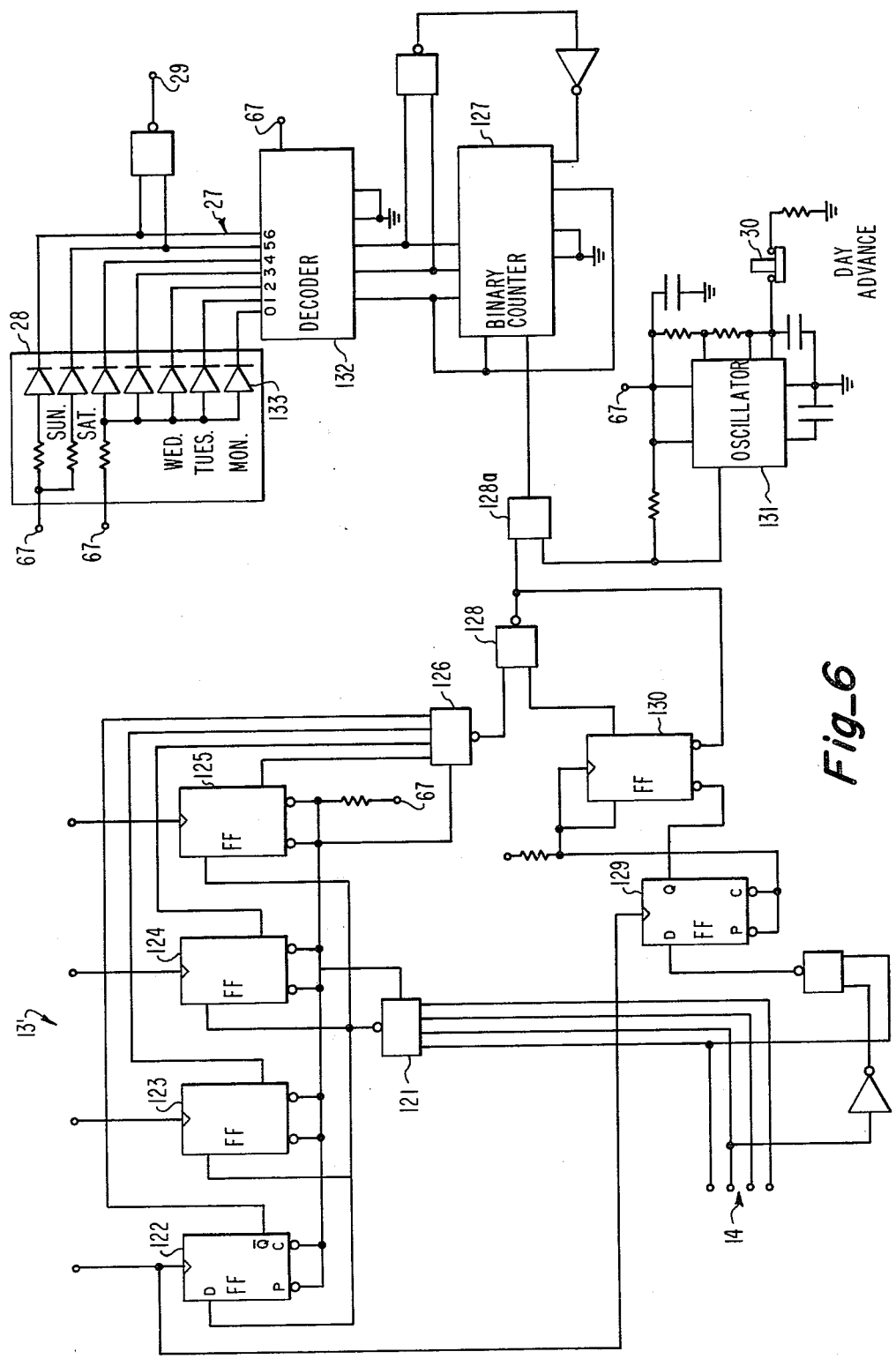

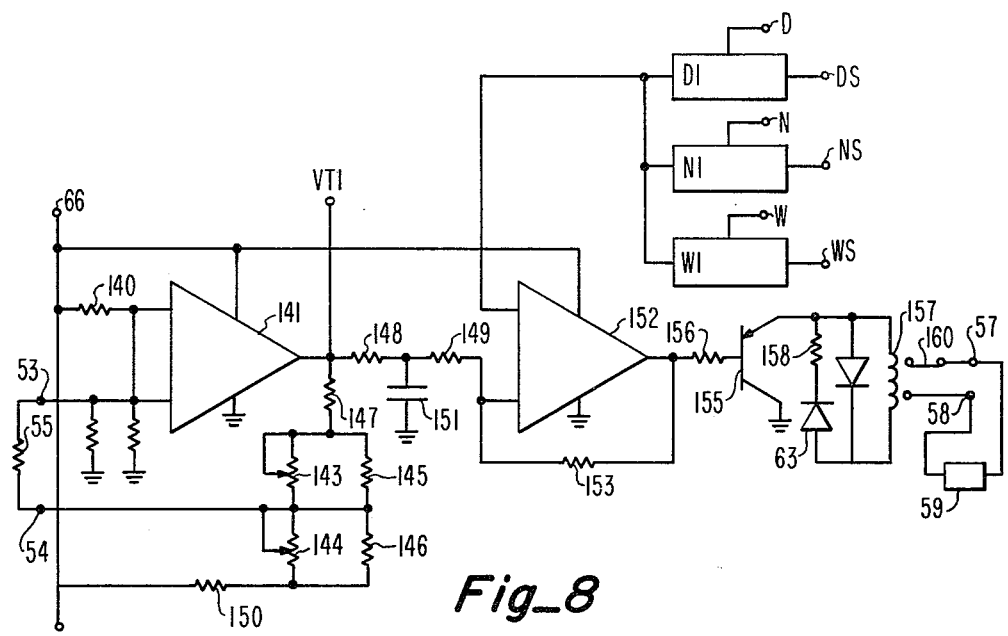
Fig_8
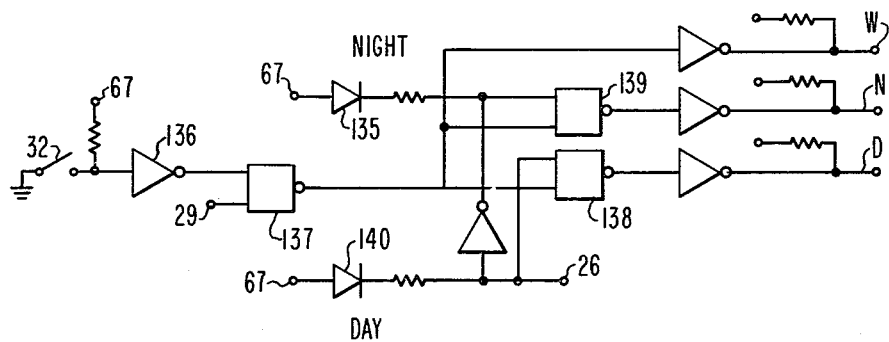
Fig_7

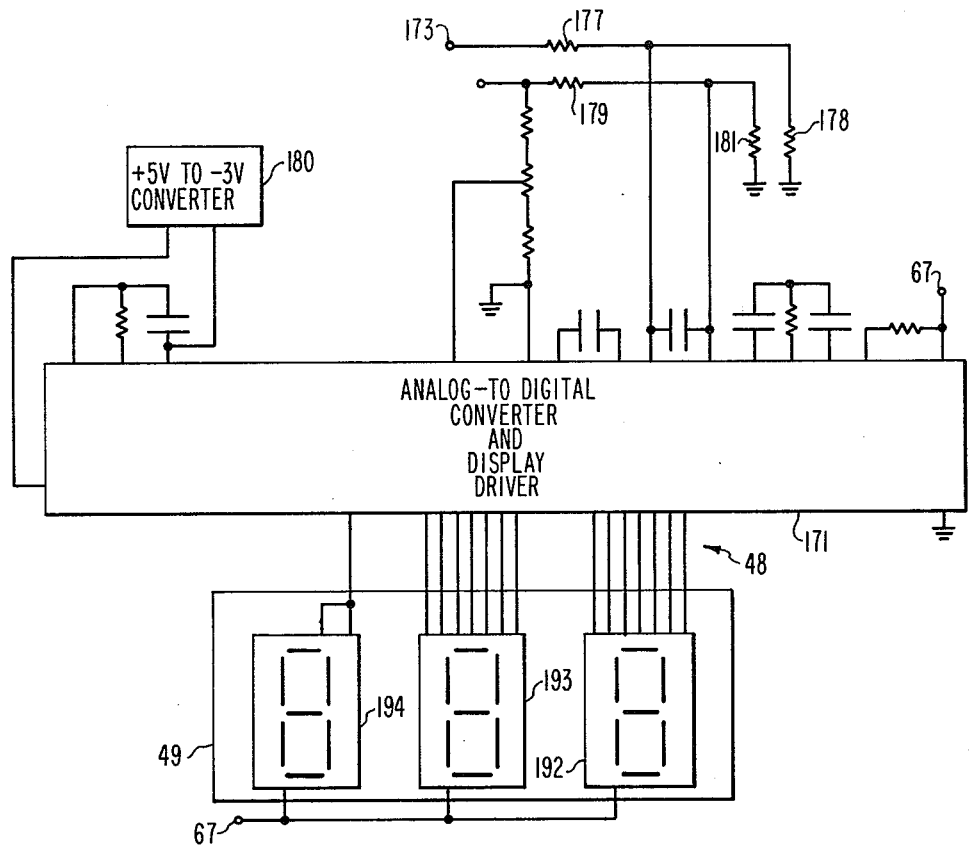
Fig_10

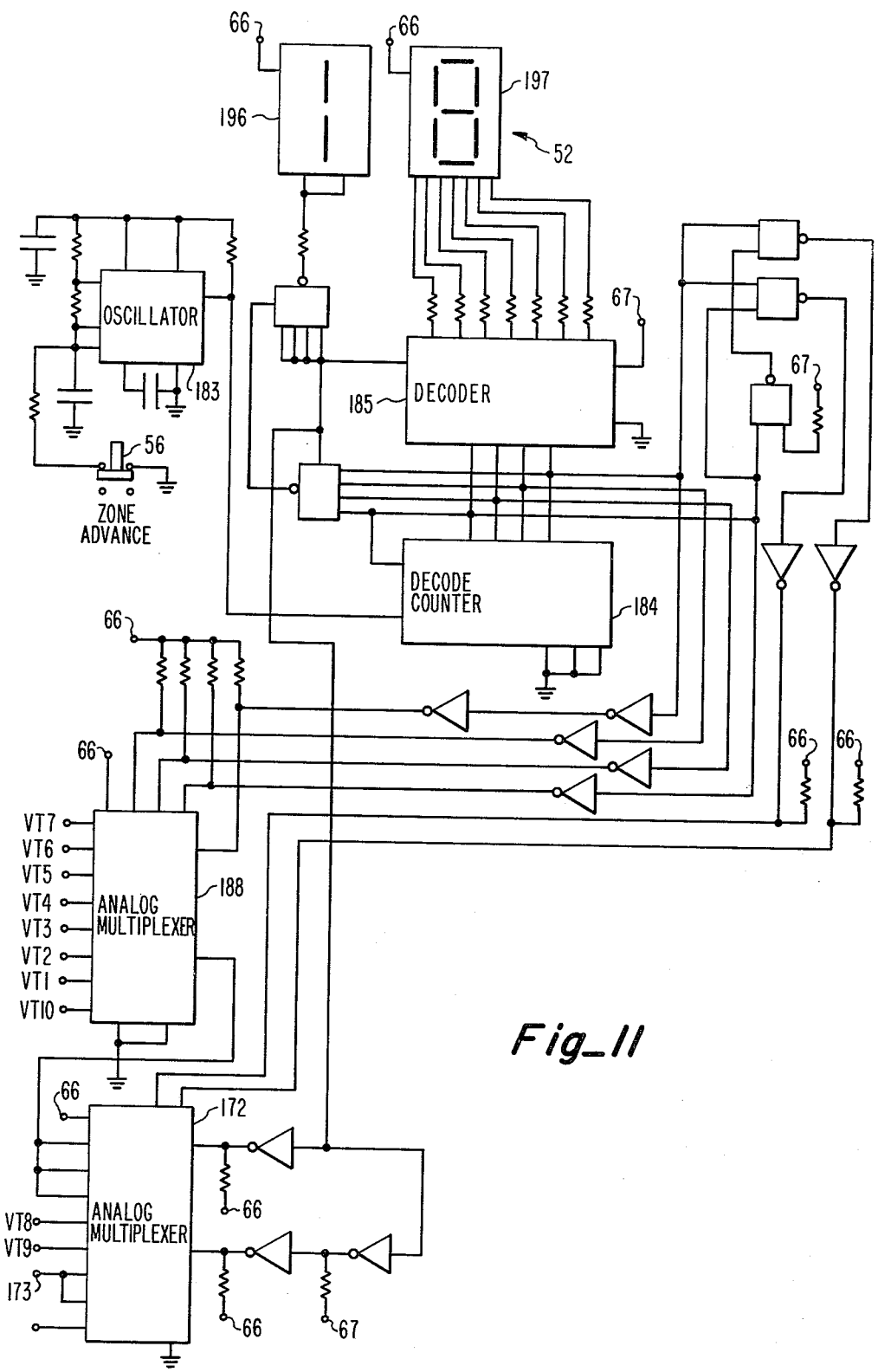
Fig_11

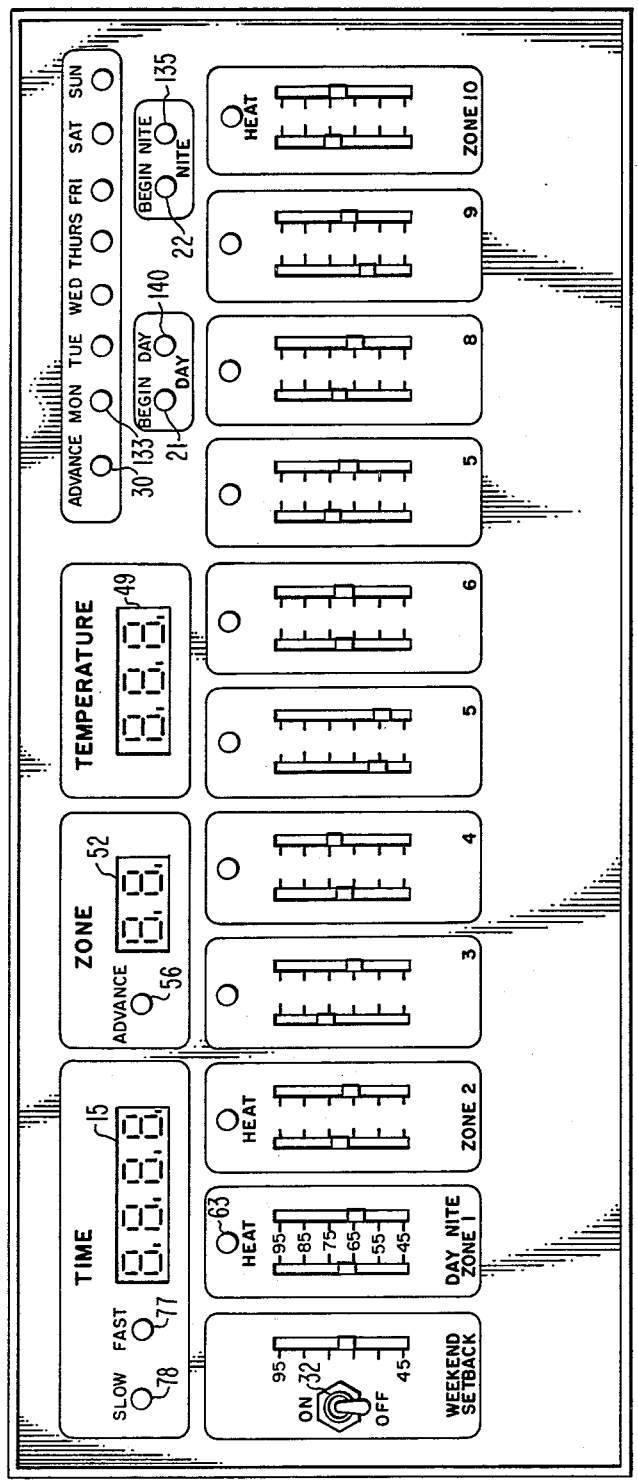
Fig_12

ELECTRONIC MULTI-ZONE TIMED TEMPERATURE CONTROL APPARATUS

TECHNICAL FIELD

This invention relates to a novel and improved electronic temperature control apparatus suitable for continuously monitoring and automatically controlling the temperature particularly in a plurality of independent zones according to preselected temperature settings for each zone over a wide temperature range for selected time intervals including days, nights and weekends.

In monitoring and controlling the temperature in a plurality of zones it is important to be able to set different temperatures for different times of the day for different zones in a building, particularly in order to save energy when no heating or cooling is required. It is also advantageous to be able to know the temperature in each zone at any particular time.

BACKGROUND ART

A variety of electronic temperature control apparatus has heretofore been provided. The prior art has temperature control apparatus for single zones that are adapted for changing the settings for day and night modes of operation, as in U.S. Pat. Nos. 3,929,284, 3,964,677 and 4,154,397. Temperature controllers for controlling the temperatures in multiple zones are disclosed in U.S. Pat. Nos. 3,930,611, 4,079,366 and 4,090,248. The prior art, however, is deficient in many areas which, inter alia, are the lack of individual temperature settings, temperature measurements and adjustments for each zone when controlling a plurality of zones, displays of time, temperature, or consecutive displays of control status for each zone. Nor does the prior art control apparatus employ digital logic circuits for this purpose which are comparatively inexpensive and easy to preset as compared, for example, to computer controlled temperature apparatus.

DISCLOSURE OF INVENTION

In accordance with the present invention there is provided temperature control apparatus capable of automatically measuring and maintaining preset temperatures in a plurality of different zones. The temperature selection is automatically changed for a day mode, a night mode and a weekend mode according to a selected temperature setting over a range of selected temperatures. The current time, day of week and temperature for each zone is displayed. The control status of each zone is displayed and the temperature for each zone is independently adjustable. Less expensive digital logic circuits are employed so that no costly computer apparatus is required.

OBJECTS

Accordingly it is an object of the present invention to provide a highly versatile, all electronic temperature control apparatus for automatically changing the temperature in a zone or plurality of zones over a selected time cycle.

Another object of the present invention is to provide novel temperature control apparatus utilizing digital logic circuits so as not to require a programmed computer.

A further object of the present invention is to provide novel temperature control apparatus utilizing a simple and highly effective temperature sensing circuit.

Still another object of the present invention is to provide a novel electronic temperature control apparatus for a plurality of zones characterized by a range of about 45° F. to 95° F., two temperature changes per day per zone, a weekend setback, electric contact type output that interfaces with a variety of heating and cooling devices, and a central control panel that displays time of day, day of week and zone temperatures.

Other objects, advantages and capabilities of the present invention will become more apparent as the description proceeds, taken in conjunction with the accompanying drawings in which like parts have similar reference numerals and in which:

BRIEF DESCRIPTION OF DRAWINGS

FIG. 1 is a block diagram showing temperature control apparatus embodying features of the present invention;

FIG. 2 is a circuit diagram showing portions of the real-time clock and the registers and comparison logic circuit;

FIG. 3 is a circuit diagram showing the remainder of the real-time clock and the time of day display;

FIG. 4 is a circuit diagram showing the remainder of the registers and comparison logic circuit;

FIG. 5 is a circuit diagram showing the loading circuit;

FIG. 6 is a circuit diagram showing the day of week counter and display;

FIG. 7 is a circuit diagram showing the control logic circuit;

FIG. 8 is a circuit diagram showing the temperature sensing and load control circuit;

FIG. 9 is a circuit diagram showing the temperature set circuit;

FIG. 10 is a circuit diagram showing a portion of the data acquisition and temperature display circuit;

FIG. 11 is a circuit diagram showing the remainder of the data acquisition circuit and the zone number display; and FIG. 12 is a front elevational view of the central control panel.

DETAILED DESCRIPTION

Referring now to FIG. 1, a temperature controller embodying features of the present invention is shown in block diagram form and will first be described generally with reference to this block diagram, followed by a more detailed description of the circuitry in each block.

A real-time clock 11 provides three different time outputs, referred to as a segment output over lines 12, a digital output over lines 13, and a BCD (binary coded decimal) digital output over lines 14. The segment and digit outputs are applied to a time of day display 15. The digit and BCD digital outputs are applied to both a DB (day begin) register and NB (night begin) register and comparison logic circuit 17 and a day of week counter 18. The digit output is also applied to a DB, NB loading circuit 19.

The DB, NB loading circuit 19 produces a loading output that is applied over lines 20 to circuit 17. A normally open day begin switch 21 of the push button type and a normally open night begin switch 22 of the push button type are connected to the loading circuit 19 for the selection of begin time for each of these modes of operation. An output from circuit 19 over line 23 operates a signal device or annunciator 24. Circuit 17 in turn produces a day/night mode status output over line 26. The day of week counter 18 produces a day of week output over line 27 that is applied to a day of week display 28 and also a weekend mode status output over line 29. A normally open day advance switch 30 is connected to the counter 18 to rapidly advance the days upon the closure thereof.

A control logic circuit 31 receives the weekend mode status output and day/night mode status output and selects which of these outputs will be applied as outputs over lines designated D, N and W, which in turn are shown as connected as inputs to each of the ten temperature sensing and load control circuits designated 41, 42 and 43. A normally open weekend enable switch 32 is connected to the control logic 31 to permit the selection of the weekend mode as desired.

There is a temperature sensing and load control circuit for each zone. As shown in FIG. 1, these circuits are designated by numerals 41, 42 and 43 for zones 1, 2 and 10, respectively. Three of these circuits are shown in FIG. 1 to show circuit interrelationships, but the third through the ninth are deleted to avoid unnecessary duplication. It is understood, however, that the embodiment being described herein has ten of these circuits so as to be specifically adapted to control the temperature of ten different zones. It is further understood that the present invention is expandable to more than ten zones and up to at least 257 zones. Each temperature sensing and load control circuit has three inputs coupled to lines D, N and W from control logic 31 above described.

A temperature set circuit 44 provides a different temperature set output for each of the day, night and weekend modes over lines DS, NS and WS which are connected as inputs to each of the circuits 41, 42 and 43, etc. The temperature settings for each mode are variable over a range of temperature settings by means of day set potentiometer 61, night set potentiometer 62 and weekend set potentiometer 165. Each circuit 41, 42 and 43 has a temperature sensed output coupled over lines VT1, VT2 and VT10, respectively, to a data acquisition circuit 47. Circuit 47 has an output connected over lines 48 to a temperature display 49 and additionally circuit 47 has an output connected over lines 51 to a zone number display 52.

With particular reference to circuit 41, this circuit has a pair of input terminals designated 53 and 54 across which a temperature sensor 55 for measuring the temperature in a zone is connected and a pair of output terminals designated 57 and 58 across which a load 59 being controlled is connected. A light 63 connected to circuit 41 lights up to indicate that the heat is on.

A power supply 65 receives conventional 110 V AC 60 cycle line power and provides several outputs at terminals 66 (+15 V DC), 67 (+5 V DC), 68 (+12 V DC) and 69 (22 V AC 60 HZ), respectively, to power the various above described circuits.

Referring now to FIGS. 2 and 3, the real-time clock 11 includes a clock chip 71 having seven terminals successively designated "a" through "g" connected to a segment driver 72 comprised of seven inverting amplifiers 73, one for each terminal, and the output of each amplifier has a series resistor 79 to provide what is herein referred to as the segment output over lines 12. The clock chip 71 also provides a digit output over lines individually designated M1, M10, H1 and H10 at four output terminals which are collectively designated by numeral 14 in FIG. 1. M1 refers to minutes times 1, M10 minutes times ten, H1 hours times 1 and H10 hours times 10. The digit output 12 indicates which of the four digits is being put out of the clock chip 71.

For the purpose of driving the time of day display 15 there are four lines of digit drivers connected between the digit output 12 and display 15, each line having two inverting amplifiers 74 and 75 and a PNP transistor 76. In practice all of the display segments of all four display elements described hereinafter are energized and the transistors 76 act as switches to disable the selected of the elements via the driver circuits to cut them out according to the current time.

The digit output 13 is applied to a delay circuit employed as a safety measure to insure the digit outputs occur at the same time as the digital outputs described hereinafter. This delay circuit shown in FIG. 2 includes four retriggerable monostable devices 35, 36, 37 and 38, each having one input connected to lines $\overline{M1}$, $\overline{M10}$, $\overline{H1}$ and $\overline{H10}$ and outputs designated DM1, DM10, DH1 and DH10. These outputs are the same as out of the clock chip 17 above described, but delayed slightly and as such are collectively designated 13'. These delayed digit outputs are used throughout except for the time of day display and the timing portion of the register and comparison logic circuit 17 shown in FIG. 1. It is understood that the delay circuit is optional and that it is employed only as a safety measure in the circuit.

The clock chip 71 has four additional outputs over lines designated $\overline{BCD1}$, $\overline{BCD2}$, $\overline{BCD4}$ and $\overline{BCD8}$ and each is passed through an inverting amplifier 80 to produce binary coded decimal outputs over lines designated BCD1, BCD2, BCD4 and BCD8, herein collectively designated as lines 14.

Finally, the real-time clock 11 has a normally open fast set switch 77 and a normally open slow set switch 78 connected to the appropriate terminals of the clock chip 71 which enable the clock to be advanced at either a fast or a slow rate to initially set the clock at the correct time.

The clock 11 has a total time span cycle of twenty-four hours using one-minute increments and is arranged to count from midnight (00:00) of one day to 23:59 and recycle. The day set is between 00:00 and 9:59AM, so the day begin is 00:00. The night begin is from 10:00AM to 11:59PM.

The time of day display shown is of a conventional construction with four display elements 81, 82, 83 and 84, each of which has seven segments 85 arranged as two boxes, one above the other, that are illuminated to display numbers 0 through 9. Proceeding from right to left, display element 84 displays minutes, element 83 displays tens of minutes, element 82 displays hours and element 81 displays tens of hours.

Referring now to FIG. 4, the registers and comparison logic circuit 17 contains two groups of four quad latch chips. The group of latches on the left is designated 86, 87, 88 and 89. Proceeding from bottom to top, latch 86 stores hours times 10, latch 87 stores hours times 1, latch 88 stores minutes times 10 and latch 89 stores minutes times 1. These latches have inputs to which the BCD digital output 14 from the clock is applied, store day begin times, and are loaded by pressing a day begin button 21. The group of latches on the right is designated 91, 92, 93 and 94, stores night begin times, and the latches are loaded by pressing a night begin button 22. Each of these eight latches is interfaced to a common four-bit bus 95 via an associated tri-state non-inverting driver 96. The bus is coupled to the input of a four-bit comparator 97. The digital output 14 from the clock 11 is also coupled as an input to the comparator 97. This circuit also includes four D flip-flops 101, 102, 103 and 104, each having one of the delayed digit lines 13' coupled thereto and an output coupled to the comparator and to flip-flop 106.

When all four digits contained in the latches are equal to the digits of the binary coded digital output 14 of the clock, the comparator 97 has a day-night status output over line 26 indicating these are equal. When each is equal, one of the flip-flops 101, 102, 103 and 104 is loaded. When all are equal all four flip-flops are loaded with a "1". This is detected by a NAND gate 105 and used to set the day-night flip-flop 106 which is loaded with an "0" signal. Similarly, when the clock digital output is found to be equal to the contents of the night begin latches, the flip-flop 106 is loaded with a "1" indicating nighttime.

Another flip-flop 107 has an input coming from a two-input NOR gate 108. This flip-flop 107 provides a signal to insure that the day-night flip-flop 106 is always loaded with the correct state and precludes incorrect loadings through the gating from the comparator 97.

The loading circuit 19 (FIG. 5) consists of six D flip-flops 111–116 and a number of associated gates which function as a digital sequencer to load the latches above described with either day begin or night begin times. In addition there is shown a reset timer chip 117 and a signal timer chip 118 for turning the signal device (beeper) or annunciator 24 off and on. The digit output 13' from the clock is shown as applied as an input to each of the four flip-flops 113–116.

When the day begin button 21 is pushed, a sequence begins that loads the digital output 14 of the clock into each of the latches, beginning with the minutes times 1 which is loaded into the top latch until hours times 10 which are loaded into the bottom latch. The digital sequencer then resets itself and waits for another input from the day begin or night begin switch. The loading of the night begin latches is accomplished in an identical manner. The loading output out of the sequencer is over lines designated DBM1, DBM10, DBH1, DBH10 for day and NBM1, NBM10, NBH1 and NBH10 for night.

The comparison of the BCD digital output 14 of the clock with the contents of the latches can only be accomplished in the four-bit comparator 97 if the drivers 96 are enabled at the proper times. The enable signals for the drivers 96 are generated by a timing circuit portion of circuit 17 shown in FIG. 2. In this timing circuit negative pulses over lines CD1, CD2, CD3 and CD4 occur during the morning when the digital output B of the registers and comparison logic goes high. This is used as a sample signal. Timing pulses over lines CN1, CN2, CN3 and CN4 occur during the night. Accordingly, the timing signals which control the drivers 96 are derived directly from the digit output 13 of the clock conditioned upon the time of day.

As shown in FIG. 6, the day of week counter 18 has a four-input NOR gate 121 receiving the digital output over lines 14 from the clock, together with four D flip-flops 122, 123, 124 and 125, each receiving an input from one of the digit outputs from the clock over lines 13', and these flip-flops function to determine when all four input digits from the clock 11 are zero. This indicates a certain time in the twenty-four hour period of 00:00, i.e., midnight. When this time occurs all four flip-flops 122–125 are set and the output of a four-input NOR gate 126 controlled by these flip-flops is gated to a four-bit binary counter 127.

A NAND gate 128, between NOR gate 126 and counter 127, is fed by two D flip-flops 129 and 130 and functions to prevent spurious counts from reaching counter 127. The NAND gate 128a is fed by an oscillator 131 arranged to gate through the day count from the rest of the system or to gate through the output of the oscillator 131 which is controlled by the day advance button 30. When the normally closed advance switch 30 operated by a button is depressed, the oscillator is astable and begins to oscillate, thus providing a signal to the counter 127 causing it to rapidly count from day to day.

The output of the counter 127 feeds to a 1-of-10 decoder 132. Each of seven of the outputs of the decoder 132 is fed to the day of week display 28 described hereinafter. The output of the counter 127 is then decoded and the day light is seen to advance by one.

The last two days (Saturday and Sunday) are decoded by a two-input NAND gate 134. This NAND gate 134 provides the weekend mode status output over line 29.

The day of week display 28 is comprised of seven light emitting diodes 133, each having associated indicia on the control panel indicating one day of the week. Each time midnight is reached the light is seen to advance by one.

The control logic circuit 31 shown in detail in FIG. 7 receives the weekend status output over line 29 and the day night status over line 26 and functions to operate the temperature sensing and load control circuits in either a day, night or weekend mode.

The normally open weekend enable switch 32 controls an input voltage to an inverter 136 which in turn is applied as an input to a NAND gate 137. The other input to the NAND gate 137 is connected to the weekend status output line 29. The output of gate 137 is applied to the input of another NAND gate 138 and the other input to gate 138 is from line 26 so that the output of NAND gate 138 is a night mode output over line designated N. Similarly, another NAND gate 139 receives an inverted signal from line 26 and from the output of NAND gate 139 is a day mode output over a line designated D. The output of NAND gate 137 is a weekend mode and is on a line designated W. A light emitting diode 135 which is located on the control panel and is connected between a bias voltage terminal 67 and the other input to gate 139 indicates the night mode is on. A light emitting diode 140 is located on the control panel and is connected between a bias voltage terminal 67 and the input gate 138 indicates the day mode is on.

In the operation of this control logic circuit 31, during the day the day output over line D is high and during the night the night output over line N is high. If the weekend enable switch is open the detected weekend output from the decoder 132 does not affect outputs over lines N or D. The output on line W stays low at all times.

Referring now to FIG. 8, the temperature sensing and load control circuit 41 includes a temperature sensing portion with input terminals 53 and 54 to which the temperature sensor 55 is connected. An operational amplifier 141 has one input connected to input terminal 53 and another input connected to a bias voltage terminal 66 via a resistor 140. A voltage attenuator consisting of adjustable potentiometers 143 and 144, bias resistors 145 and 146, and series resistors 147 and 150 in turn are connected between the output of amplifier 141 and input terminal 54. This amplifier 141 is connected as a transimpedance amplifier with a variable offset and variable gain. This circuit is specifically designed to operate with a resistive-type RTD platinum film sensor for element 55. In practice the temperature sensor 55 is positioned at a desired location in the zone being sensed and suitable wires extend from the sensor to terminals 53 and 54 which are located on the back of a box in which the circuits described herein are contained. This permits the use of sensors remote from the control box.

The sensor portion above described performs three different functions. First, it provides a current source drive to the linear resistance temperature sensor 55 which varies approximately from 3000 ohms to 4000 ohms as its temperature varies from 0° F. to 200° F. The sensing circuit then converts the resultant voltage into an output which varies between four and fourteen volts as the temperature varies from 0° F. to 200° F. In summary, the sensor portion of the controller circuit 41 drives the sensor 55 with a constant current, takes the output of the sensor, amplifies it, and provides a voltage offset to the output. The zero and gain characteristics of the amplifier are adjustable by potentiometers 143 and 144. All these functions are accomplished with a single operational amplifier and a limited number of components.

The output of the operational amplifier 141 is connected into the data acquisition circuit 47 discussed more fully hereinafter over line VT1. The output of the operational amplifier 141 is also connected via two series resistors 148 and 149 separated with a capacitor 151 into an input of a second operational amplifier 152. The two resistors and capacitor are a noise filter to prevent spurious electrical signals from entering the second amplifier. Amplifier 152 is connected as a comparator in a comparator portion of the circuit and has a reference input that is selectively switched on and off from the outputs of three analog gates or switches, designated D1, N1 and W1.

These three analog gates function to control the operation of the comparator portion. The day and night analog switches D1 and N1 have the variable potentiometers 61 and 62, respectively, located on the control panel for one zone. The potentiometers have a voltage source applied thereacross. The weekend switch W1 is fed by a single voltage from reference circuit 44 discussed hereinafter, as there is only one weekend temperature set for the entire system.

The circuit is arranged so that only one of the analog switches D1, N1 and W1 is active at any one time so that each comparator is comparing against a day temperature setting, a night temperature setting or a weekend temperature setting. The comparator has a resistor 153 in a feedback line between its output and one input which corresponds to a 3° F. hysterisis.

The output of the amplifier 152 drives a PNP transistor 155 via resistor 156 and a relay coil 157 of a single pole double throw relay. Across the relay coil 157 is connected a resistor 158 in series with a light-emitting diode 63 mounted on the front panel for the associated zone to give a visual indication that the relay has been activated and the heat is on. The relay coil 157 actuates single pole double throw contacts 160 connected to the output terminals designated 57 and 58 across which a selected load 59 is connected.

In the operation of the control circuit 41, if the sensed temperature output from the sensing portion becomes lower than the reference set output to the comparator via either of the day, night and weekend switches D1, N1 and W1, the relay coil is activated and stays activated until the sensed temperature output becomes approximately 1½° F. higher than the temperature set output to the comparator. The contacts of the relay are connected to the output terminals, which are on a rear panel terminal strip on a control box containing the circuitry. Each sensor 55 is identical for each zone.

Referring now to FIG. 9, the temperature set circuit 44 is specifically adapted to use a relatively low cost low tolerance adjustable potentiometer in place of a high accuracy voltage divider. To this end a voltage source having outputs at lines V1 and V2 is applied to the opposite ends of the potentiometer 61 for the day and 62 for the night. In practice V1 is 6.25 volts and V2 is 8.75 volts. These supply voltages for the potentiometer are provided using the bias voltage at terminal 66 that is applied to an input of each of amplifiers 161 and 162. Amplifier 161 has an output connected through an NPN transistor 163 to provide V2 and amplifier 162 has an output connected through a PNP transistor 164 to provide V1.

The adjustable potentiometer 165 for the weekend mode is connected across outputs V1 and V2 and is amplified by amplifier 169 having an output at a line designated WS. In this way all of the day set potentiometers 61 are supplied by the power at terminals V1 and V2 while the weekend set potentiometer 165 supplies ten weekend set circuits and requires additional amplification by amplifier 169 which also serves to isolate the weekend set voltages from the day and night temperature set voltages.

The data acquisition circuit 47 includes a combination analog-to-digital converter and display driver chip 171 from which there is produced a temperature display output over lines 48 as shown in FIG. 10. There is further provided an analog multiplexer 172 (FIG. 11) that generates an output over line 173 that is connected to the input terminals 174 and 175 of chip 171. The analog multiplexer 172 selects or chooses one of the ten temperature sensors for each zone.

The output from the sensor portion of circuit 41 is four to fourteen volts corresponding to 0° to 200° F. The inputs to the chip 171 from line 173 are attenuated by a factor of 5 with resistors 177 and 178. One of the inputs is offset 0.8 volts via resistor 179 and resistor 181. This circuitry then converts the four to fourteen volt input signal to a zero to two volt input signal to the chip 171. The decimal point is suppressed so that a two-volt measurement in the converter becomes a 0 to 200 display. A conventional power converter 180 provides one power input to chip 171.

The control circuit 47 further includes an astable oscillator 183 controlled by a zone advance switch 56 actuated by a button. When the button closing switch 56 is depressed a decade counter 184 begins counting. As the counter counts, a decoder 185 decodes this count and it is displayed by the zone number display 52 as one number between one and ten.

The binary signal used to provide the zone number is coupled to analog multiplexers 188 and 172. These analog multiplexers in turn are connected to gate the temperature sensor outputs over lines VT1 through VT10, inclusive, so that the sensor channel which has its number displayed is automatically gated by the analog multiplexer 172 to the temperature display so that there is displayed the temperature in degrees Fahrenheit from the sensor channel which has its number displayed in the zone number display 52.

The temperature display 49 has three seven-segment display elements 192, 193 and 194 for displaying temperatures from 0° to 200° F.

The zone number display 52 has two seven-segment display elements 196 and 197 for displaying ten zones.

Referring now to FIG. 12, the central control panel P is shown. This control panel supports the displays, temperature selectors and has various corresponding word indicia to identify each.

In initially setting the device for a full sequence of operation, the day begin and night begin times, the time of day and the day of week displays are preset. To accomplish this, the time of day display is adjusted to the time that the day is desired to begin. When that time is reached, using slow set and fast set controls, the day begin button 21 is depressed. A short tone is heard from annunciator 24, verifying that the day begin time is loaded into its register. Then the time of day display on the time clock is advanced to the time at which night is desired to begin. At that time, the night begin button is depressed. Another short tone is heard indicating that the system has loaded the night begin time into its memory. Then the time clock is advanced to the actual time of day.

Following these adjustments, the day advance button 30 is pushed and the day display is advanced until the display light indicates the current day of the week. The day advance button 30 is released at this time. The system is now set up with the proper day begin and night begin times, the proper time of day and the proper day of week.

Next the day and night temperatures of each zone are adjusted via the adjustments on the front panel. The actual temperature that the system will maintain is printed on the panel overlay and varies between 45° and 95° F. In order to fully set the system up, the user sets the front panel controls to the desired day temperature for each zone, followed by the desired night temperature for each zone.

If weekend setback capability is desired, the weekend setback switch 32 is turned on and the weekend setback temperature is adjusted to the desired level by adjusting potentiometer 165.

The temperature in each of the ten zones can be observed by depressing the zone advance switch 56 until the number of the desired zone appears. The temperature in degrees F. will then appear in the temperature display window. If that temperature is lower than the temperature desired, the user merely raises the associated set temperature for that zone. For example, if a 65° temperature is observed in zone 2 during the day and it is desired to raise that temperature to 70°, the user readjusts the day adjustment and zone 2 to 70°. Similarly, if the temperature is observed in a particular zone to be higher than that desired, the user reduces the control setting of the associated zone heat control. In order to prevent energy waste in cycling of the heating system, the system does have a three-degree temperature hysteresis. For example, a temperature setting of 70° will produce a variation between 68½° and 71½°. Thus the temperature will vary about a center point which is set by the zone control.

By way of illustration only and not by way of limitation, there are listed below devices which have been found suitable for use in the illustrated circuits:

| | Part No. | Reference Nos. |
|---|---|---|
| Clock chip | MM 5312 | 71 |
| Latch | SN 7475 | 86–89, 91–94 |
| Driver | SN 74125 | 96 |
| Four-bit comparator | SN 7485N | 97 |
| D Flip-flop | ½ SN 7474 | 101–104, 106, 107, 111–116, 122–125, 129, 130 |
| Timer chips | NE 555 | 117, 118 |
| Binary counter | SN 7490M | 127, 184 |
| Oscillator | NE 555 | 131, 183 |
| Decoder | SN 7442N | 185 |
| Amplifier | 741 CN | 141, 152 |
| Relay | CD 603 | 157, 160 |
| A to D converter and display driver | 7107 | 171 |
| Analog multiplexer | CD 4016B | 172 |
| Analog multiplexer | CD 4051B | 188 |
| Retriggerable monostable | SN 74123N | 35–38 |
| Decoder | 7442 | 132 |

Although the present invention has been described with a certain degree of particularity, it is understood that the present disclosure has been made by way of example and that changes in details of structure may be made without departing from the spirit thereof.

What is claimed is:

1. Timed temperature control apparatus for a zone comprising:

clock means producing time output over a repetitive time cycle;

time display means responsive to said time output to display current time;

digital logic circuit means responsive to said timed output alternately producing a day mode status output and a night mode status output;

a temperature set means providing a different temperature set output for each said day modes and night modes, each temperature set being variable and preset to a selected temperature for that mode;

temperature sensing and load control means including a sensing circuit portion having input terminals to which a temperature sensor for the zone is connected, each said sensing circuit portion having switching means responsive to said day and night mode status outputs from said temperature set outputs from said temperature set means to establish a set temperature for each mode, said temperature sensing and load control means including a load control portion with a comparator for comparing the relative magnitudes of the sensed temperature output and coupled to output terminals to which a load device for the zone is connected whereby to continuously measure the temperature in said zone during the day and during the night to actuate a load control device when the temperature drops below or goes above a selected temperature setting; and temperature display means responsive to the temperature sensed output of said sensing circuit portion to display the temperature of the zone, said temperature sensor being a resistance-type RTD platinum film.

2. Timed temperature control apparatus as set forth in claim 1 wherein said sensing circuit portion includes an amplifier with a voltage attenuator connected between the output and an input thereof forming a transimpedance amplifier with a variable offset and variable gain.

3. Timed temperature control apparatus as set forth in claim 2 wherein said attenuator has four legs with two legs having adjustable potentiometers and two legs having fixed resistors.

4. Timed temperature control apparatus as set forth in claim 2 wherein said attenuator provides a resultant output which varies between about four and fourteen volts as the temperature varies between about 0° F. and 200° F.

5. Timed temperature control apparatus for a plurality of independent zones comprising:
clock means producing time output over a repetitive time cycle;
first display means responsive to said time output to display current time;
digital logic circuit means responsive to said timed output alternately producing a day mode status output, a night mode status output and optionally a weekend mode status output;
a temperature set means providing a different temperature set output for each said weekend mode status, day mode status and night mode status, each temperature set being variable and preset to a selected temperature for that mode, said temperature set means having a first temperature selector for each zone for setting the temperature of the day mode over a range of temperature settings, a second temperature selector for each zone for setting the temperature of the night mode over a range of temperature settings, and a third temperature selector for all zones setting the temperature of the weekend mode over a range of temperature settings;
temperature sensing and load control means for each zone, including a sensing circuit portion for each zone having input terminals to which a temperature sensor for an associated zone is connected for each zone being controlled, each said sensing circuit portion having switching means responsive to said day, night and weekend mode status outputs from said control logic and said temperature set outputs from said temperature set means to establish a set temperature for each mode, said temperature sensing and load control means including a load control portion with a comparator for comparing the relative magnitudes of the sensed temperature output and coupled to output terminals to which a load device for the associated zone is connected whereby to continuously measure the temperature in each zone during the day, during the night and optionally during the weekend and compare the temperature measurements with the settings in said first, second and third selectors and to actuate a load control device when the temperature drops below or goes above a selected temperature setting of said selectors;
data acquisition means responsive to a temperature output from each of said temperature sensing portions to address each temperature sensor for each zone and provide a first output corresponding to the zone and a second output corresponding to the associated measured temperature for that zone, said data acquisition means having a zone advance actuator to rapidly advance the zones to a selected zone;
zone display means responsive to said first output for displaying the zone monitored; and
temperature display means responsive to said second output to display the temperature of the zone indicated by said zone display means.

6. Timed temperature control apparatus as set forth in claim 5 wherein said clock means includes a segment output and a digit output for operating said first display means.

7. Timed temperature control apparatus as set forth in claim 6 wherein said clock has a digit output over four lines for four digits corresponding to minutes, minutes times ten, hours, and hours times ten with a time cycle of twenty-four hours.

8. Timed temperature control apparatus as set forth in claim 5 including time selector means for rapidly advancing the clock means to the current time.

9. Timed temperature control apparatus as set forth in claim 5 wherein said first display means is on a control panel and includes four display elements with seven display elements per segment to successively display the numbers between 00:00 and 23:59 over a twenty-four hour time cycle.

10. Timed temperature control apparatus as set forth in claim 5 wherein said day set time range is midnight to 9:59 AM and said night set time range is 10:00 AM to 11:59 PM.

11. Timed temperature control apparatus as set forth in claim 5 wherein said weekend status output is from 12:00 AM Saturday to 12:59 PM Sunday.

12. Timed temperature control apparatus as set forth in claim 5 wherein said comparator has a resistor in the feedback loop between its input and output which corresponds to about a 3° F. hysteresis.

13. Timed temperature control apparatus as set forth in claim 5 including a load relay connected to the output of said comparator, said relay including a set of single-pole double-throw contacts connected to said output terminals.

14. Timed temperature control apparatus as set forth in claim 5 including a heat indicator connected to the output of said comparator, said heat indicator being on a control panel to indicate the heat is on.

15. Timed temperature control apparatus as set forth in claim 5 wherein said temperature selectors for each of said day, night and weekend modes are adjustable potentiometers to which a selected supply voltage is applied, each said potentiometer having a movable wiper to change the temperature set voltage for each mode.

16. Timed temperature control apparatus as set forth in claim 5 including a scale on a control panel having indicia in increments indicating temperatures over a range.

17. Timed temperature control apparatus as set forth in claim 15 wherein the temperature range setting for each potentiometer is in increments between 45° F. and 95° F.

18. Timed temperature control apparatus as set forth in claim 5, said temperature set means including two separate power supplies providing two different DC voltages, said DC voltages being applied to the potentiometers for day and night modes.

19. Timed temperature control apparatus as set forth in claim 18 wherein the potentiometer for the weekend mode is across said DC voltages and the output of the weekend mode potentiometer is applied to an amplifier.

20. Timed temperature control apparatus as set forth in claim 5 wherein said data acquisition means includes an analog-to-digital converter and an analog multiplexer that selects one of the temperature sensors and this sensed temperature is converted by said converter to a range of voltages which in turn is displayed by a temperature display.

21. Timed temperature control apparatus comprising:
clock means producing time output over a repetitive time cycle;
first display means responsive to said time output to display current time;
register means responsive to said time output arranged for storing a selected day begin time in minute increments over a selected day set time range for a day mode and a selected night begin time in minute increments over a night set time range for a night mode;
loading means responsive to said time output having a day begin selector and a night begin selector, said loading means coupled to said register to load selected day begin and night begin times into said register means;
comparison logic means responsive to the output of said registers and said time output for comparing stored time with current time and producing a day mode status output for one portion of the time cycle and night mode status output for another portion of the time cycle;
day of week counter means responsive to said time output detecting the passage of twenty-four hour time intervals and producing a day of week output and a weekend mode status output for a weekend mode, said counter means having a day advance portion including an advance actuator for rapidly advancing the days;
second display means responsive to said day of week output for indicating the current day of the week;
control logic means responsive to said day mode status output, night mode status output and weekend mode status output to produce a mode status output indicating that one of said modes is in effect at one time, said control logic means having a weekend enable selector to selectively effect said weekend mode as desired;
a temperature set means providing a different temperature set output for each of said weekend modes, day modes and night modes, each temperature set being variable and related to a preselected temperature setting for that mode, said temperature set means having a first temperature selector for each zone for setting the temperature of the day mode over a range of temperature settings, a second temperature selector for each zone for setting the temperature of the night mode over a range of temperature settings and a third temperature selector for all zones for setting the temperature of the weekend mode over a range of temperature settings;
temperature sensing and load control means for each zone including a sensing circuit portion for each zone having input terminals to which a temperature sensor for an associated zone is connected for each zone being controlled, each said sensing circuit portion having analog switching means responsive to said day, night and weekend mode status outputs from said control logic and said temperature set outputs from said temperature set means to establish a set temperature for each mode, said temperature sensing and load control means including a load control portion with a comparator for comparing the relative magnitudes of the sensed temperature output and coupled to output terminals to which a load device for the associated zone is connected whereby to continuously measure the temperature in each zone during the day, during the night and optionally during the weekend and compare the temperature with the settings in said first, second and third selectors and to actuate a load control device when the temperature drops below or goes above a selected temperature setting of said selectors, said temperature sensor and control means having an indicator for each zone for indicating the heat is on in one of said zones;
data acquisition means responsive to a temperature output from each of said temperature sensing portions to address each temperature sensor for each zone and provide a first output corresponding to the zone and a second output corresponding to the associated measured temperature for that zone, said data acquisition means having a zone advance actuator to rapidly advance the zones to a selected zone;
zone display means responsive to said first output for displaying the zone monitored; and
temperature display means responsive to said second output to display the temperature of the zone indicated by said zone display means.

22. Timed temperature control apparatus as set forth in claim 21 wherein said register means includes a day begin register for storing a selected day begin time and a night begin register for storing a selected night begin time.

23. Timed temperature control apparatus as set forth in claim 22 wherein each said day begin register and night begin register includes four latches, one for each time digit, and a driver coupled to the output of each latch, the outputs of said latches being connected to a common bus.

24. Timed temperature control apparatus as set forth in claim 23 wherein said comparison means includes a comparator coupled to said bus and responsive to said time output and a flip-flop coupled to the output of said comparator that is set to the night mode and reset to the day mode to provide said day-night mode status output.

25. Timed temperature control apparatus as set forth in claim 21 including signal means coupled to said loading means to indicate that the selected day begin time and night begin time has been loaded into said register means.

26. Timed temperature control apparatus as set forth in claim 21 wherein said day of week counter means includes a four-bit counter responsive to a digit input from said clock means via four flip-flops and a binary coded decimal output via gates and a decoder coupled to said counter for providing seven outputs, one for each day of the week.

27. Timed temperature control apparatus as set forth in claim 21 wherein said second display means includes a visual indicator coupled to one output for each of said decoders for successively displaying the seven days of the week after each twenty-four hour time interval passes.

28. Timed temperature control apparatus as set forth in claim 21 wherein said day advance portion includes an electric oscillator.

* * * * *